United States Patent

[11] 3,543,857

[72] Inventor Robert V. Gerner
          Bartlesville, Oklahoma
[21] Appl. No. 755,392
[22] Filed Aug. 26, 1968
[45] Patented Dec. 1, 1970
[73] Assignee Phillips Petroleum Company
          a corporation of Delaware

[54] PRODUCING WELLS BY INTERNAL HEAT GENERATION TO AVOID PLUGGING
     2 Claims, No Drawings

[52] U.S. Cl. .................................... 166/302, 166/310
[51] Int. Cl. ..................................... E21b 43/00
[50] Field of Search .......................... 166/244, 302, 310; 299/5, 6; 252/8.3; 137/13

[56] References Cited
     UNITED STATES PATENTS

| | | | |
|---|---|---|---|
| 1,259,537 | 3/1918 | Lucas et al. | 299/6X |
| 2,675,081 | 4/1954 | Nowak | 166/302 |
| 3,131,914 | 5/1964 | Miller | 299/6X |
| 3,259,187 | 7/1966 | Prats et al. | 166/302X |
| 3,331,657 | 7/1967 | Peter et al. | 252/8.3X |
| 3,393,690 | 7/1968 | Chu et al. | 137/13 |
| 3,393,733 | 7/1968 | Kuo et al. | 299/5X |

OTHER REFERENCES

Kennedy, Harvey T., et al. Equilibrium in the Methane-Carbon Dioxide-Hydrogen Sulfide-Sulfur System. In J. Petroleum Technology, July, 1960, pp. 166—169. (Copy in 166—244)

*Primary Examiner*—Marvin A. Champion
*Assistant Examiner*—Ian A. Calvert
*Attorney*—Young and Quigg ABSTRACT: The temperature of fluid being produced from a well is maintained above the congealment point by introducing into the well at a point at which congealable material is still fluid a reactant for generating heat within said fluid sufficient to maintain said fluid noncongealed until it has been produced from the well. A specific method of producing wells whose production includes elemental sulfur which will congeal in the upper portions of the well comprises introducing a reactive fluid, e.g. oxygen-containing gas into the flow tubing at a depth at which the temperature is still slightly above the melting point of the sulfur. The reactive fluid or oxygen-containing gas which can be air is introduced in a manner and quantity sufficient that it will react with part or all of one or more components of the natural well fluid to release the required quantity of heat to maintain the flowing fluids at a temperature in excess of the melting temperature of sulfur until the molten sulfur has reached the ground surface.

PRODUCING WELLS BY INTERNAL HEAT GENERATION TO AVOID PLUGGING

This invention relates to the production of wells. In another of its aspects, it relates to the production of a well producing among other fluids a material which can congeal on its way up through the flow tube. In a further aspect of the invention, it relates to the production of an acid-gas well, e.g. a well flowing a high percentage of $H_2S$, said well also producing some elemental sulfur.

In one of its concepts the invention provides a method for producing a well as herein described by injecting into the well at a point which congealable material is still flowing a reactant for causing a reaction there with to generate heat sufficient to prevent congealment of said congealable material until after it has been produced completely from the well tube. In another of its concepts the invention provides a method for producing an acid-gas well also producing sulfur which comprises injecting an oxidizing agent into the well for reaction with sulfur while it is still above its melting temperature or for reaction with said acid-gas so as to generate heat sufficient within said sulfur to allow it to remain noncongealed until it has reached the ground surface.

It is now occurred to me that a sour gas well, which can contain up to 98 percent $H_2S$ and which produces sulfur which causes plugging of the well tube when sulfur congeals can be better produced by injection of, say, air or other oxygen-containing gas into the well. Other gases or fluids for reaction to produce heat can be used.

An object of this invention is to produce a well producing a congealable substance which tends to plug the production tube. Another object of the invention is to produce an acid-gas well also producing sulfur which congeals in the production tube.

Other aspects, concepts, objects and the several advantages of the invention are apparent from this disclosure and the appended claims.

According to the present invention, a well producing material which can congeal in the production tube is better produced by injecting into the well at a place at which the congealable material is still fluid, a reactant for reaction with said congealable fluid or other produced fluids so as to produce heat in quantities sufficient to prevent said congealable fluid from congealing during its production from the well.

EXAMPLE

A well producing up to 98 percent $H_2S$ sour gas is produced at a bottom hole temperature of 350 to 500° F. and at a pressure which can be greater than 14,000 pounds per square inch. As the gas and sulfur which accompanies the same passes upwardly through the tubing, the sulfur tends to congeal and ultimately to cause reduction in flow capacity if not plugging of the production tube.

Air is injected at a depth of about 11,000 feet into the production tubing for reaction at the temperature there prevailing, approximately 240° F., thereby producing heat of combustion and sulfur oxidation as well as hydrogen sulfide oxidation products, the heat being generated in quantities sufficient to maintain the sulfur fluid until it has reached the end of its travel upwardly through the production tube.

In lieu of air, pure oxygen or other oxidant fluid, be it gaseous or liquid, can be used as a functional equivalent according to the concept of the present invention.

Reasonable variation and modification are possible within the scope of the foregoing disclosure and the appended claims to the invention the essence of which is that a reactive fluid is injected into the flow tubing at a depth at which the temperature is slightly above the melting point of a there-existing congealable fluid and is injected in such quantities as to react with part or all of one or more of the components of the natural well fluid so as to release heat sufficient to maintain the glowing fluids at a temperature in excess of the melting temperature of the congealable fluid, for example, sulfur, completely to the surface of the wall.

I claim:

1. A method for producing a gas well also producing a congealable liquid which in said well is naturally at an elevated temperature which is such that it will cause reaction by said congealable liquid with a reactant which reacts at said elevated temperature with said congealable liquid thus to produce heat which comprises injecting said reactant down into said well for reaction with said congealable liquid at said natural elevated temperature thus generating heat at a place wherein said well said liquid is at an elevated temperature and, therefore, not congealed to create sufficient heat in said liquid to maintain said liquid in noncongealed condition until it reaches the ground surface, and has thus been produced from said well, and producing said thus heated liquid from said well.

2. A method according to claim 1 wherein the well is a sour or acid-gas well producing substantial quantities of $H_2S$ and sulfur and the injected reactant is an oxygen-containing gas.